United States Patent [19]

Sardisco

[11] 4,343,781
[45] Aug. 10, 1982

[54] DECOMPOSITION OF 2KCl.CuCl TO PRODUCE CUPROUS CHLORIDE AND POTASSIUM CHLORIDE

[75] Inventor: John B. Sardisco, Shreveport, La.
[73] Assignee: Pennzoil Company, Houston, Tex.
[21] Appl. No.: 272,025
[22] Filed: Jun. 9, 1981
[51] Int. Cl.$^3$ .................... C01G 3/05; C01D 3/04
[52] U.S. Cl. ............................. 423/493; 423/32; 423/34; 423/42; 423/463; 423/499
[58] Field of Search .............. 423/32, 34, 42, 463, 423/493, 499

[56] References Cited

U.S. PATENT DOCUMENTS

| | | | |
|---|---|---|---|
| 1,814,822 | 7/1931 | Britton et al. | 23/302 |
| 3,278,232 | 10/1966 | Fitch et al. | 299/4 |
| 3,279,897 | 10/1966 | Goodenough et al. | 23/302 |
| 3,501,266 | 3/1970 | Gaska et al. | 423/499 |
| 3,502,431 | 3/1970 | Steinmetz | 423/493 X |
| 3,785,944 | 1/1974 | Atwood et al. | 204/107 |
| 3,798,026 | 3/1974 | Milner et al. | 75/104 |
| 3,879,272 | 4/1975 | Atwood et al. | 204/107 |
| 3,972,711 | 8/1976 | Goens et al. | 75/117 |
| 4,013,457 | 3/1977 | Goens et al. | 75/104 |
| 4,039,324 | 8/1977 | Stephens, Jr. et al. | 75/72 |

FOREIGN PATENT DOCUMENTS 430566 1/1975 U.S.S.R. .

*Primary Examiner*—Earl C. Thomas
*Attorney, Agent, or Firm*—Lowe, King, Price & Becker

[57] ABSTRACT

Cuprous chloride is produced from the complex salt, 2KCl.CuCl, obtained as a by-product in the copper industry where chalcopyrite is decomposed in the presence of potassium chloride, by a series of steps involving reaction of an aqueous solution of the complex salt of potassium chloride and cuprous chloride with ammonia, separating the resulting solid potassium chloride from a solution containing cuprous chloride and ammonia, removing the ammonia from the solution to cause precipitation of the cuprous chloride and recovering solid cuprous chloride. Ammonia may then be recycled to the solution from which the cuprous chloride is removed and to which additional complex salt is added to repeat the cycle.

13 Claims, 1 Drawing Figure

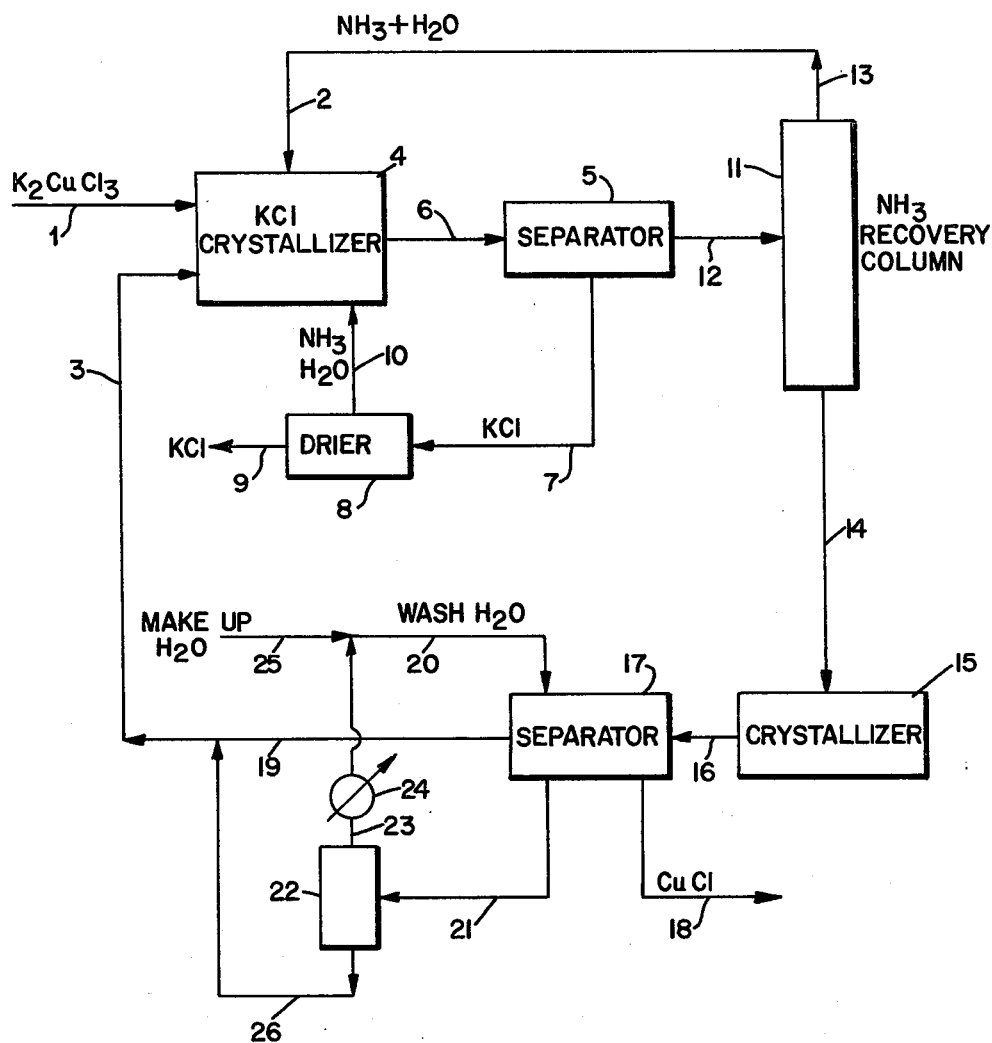

DECOMPOSITION OF 2KCl.CuCl TO PRODUCE CUPROUS CHLORIDE AND POTASSIUM CHLORIDE

TECHNICAL FIELD

This invention relates to a method for the recovery of solid cuprous chloride and potassium chloride from aqueous systems containing cuprous chloride, potassium chloride and ammonia, and particularly those systems which contain cuprous chloride and potassium chloride as the double salt $K_2CuCl_3$ or $2KCl.CuCl$, and which may also contain silver or silver salts.

BACKGROUND ART

Methods are known in the prior art concerning copper hydrometallurgy which involve recovery of cuprous chloride from process solutions with subsequent reduction to produce and recover copper metal. Patents of this type include U.S. Pat. Nos. 3,798,026, 3,972,711, 4,039,324 and 4,013,457. Major work in this field may be found in U.S. Pat. Nos. 3,785,944 and 3,879,272 to Atwood et al., which are concerned with hydrometallurgical processes for pollution-free recovery of metallic copper from copper ores, such as chalcopyrite, the most common copper-containing ore in the United States. U.S. Pat. No. 3,785,944 describes a basic hydrometallurgical process for processing copper sulfide ore concentrates, especially those containing chalcopyrite. This process has four basic stages: an oxidation stage in which copper-containing materials are oxidized with a solution containing ferric chloride and cupric chloride to form a solution containing ferrous chloride and cuprous chloride; a reduction stage in which any remaining cupric chloride in the solution from the oxidation stage is reduced to cuprous chloride, preferably by use of fresh cement copper; a copper recovery stage in which metallic copper is recovered from the cuprous chloride solution, preferably by electrolysis; and a regeneration purge stage in which ferric chloride and cupric chloride are regenerated by oxidation with concurrent purge of excess iron as well as sulfate ions and other impurtiies. The resulting leach solution is then used to oxidize additional copper-containing ore.

U.S. Pat. No. 3,879,272 to the same inventors describe improvements on the process of U.S. Pat. No. 3,785,944, especically in combining the oxidation and regeneration-purge stage and use of KCl in the system. In these patents, the reduced leach solution or electrolyte which is subsequently electrolyzed, contains impurities which are electrolyzed with the copper and it is desirable that these impurities be removed prior to electrolysis.

U.S. Pat. No. 3,972,711 claims an improvement over the Atwood patents on the basis that because the reduced leach solution of Atwood contains certain impurities, improved results are obtained by crystallizing cuprous chloride from the system so as to produce a purer grade of copper. In this process, the cuprous chloride is crystallized in the presence of a specified amount of cupric chloride.

In the system described in U.S. Pat. Nos. 3,785,944 and 3,879,272, there results, from the reaction of chalcopyrite with cupric chloride in the presence of potassium chloride, at least a 50% decomposition of the chalcopyrite. From this reaction, there is recovered a solution which contains cuprous chloride and potassium chloride.

In copending Application, Serial No. (Case 070-023) filed of even date herewith by Leonard R. Ochs, there is disclosed a method by which the hydrometallurgical processes described in U.S. Pat. Nos. 3,785,944 and 3,879,272 can be carried out with improvements in obtaining aa purer grade of copper by minimizing the presence of impurities within the system prior to hydrolysis. This improvement provides a crystallization stage wherein solids in the form of complex salts of potassium chloride and cuprous chloride are crystallized and removed from the system to provide a resultant increase in the copper product produced. These complex salts of potassium chloride and cuprous chloride, of the formula $K_2CuCl_3$ or $2KCl.CuCl$, may then be removed from the system and used as desired. Some silver in the system may also be precipitated with these salts.

The present invention provides a method whereby these complex or double salts of cuprous chloride and potassium chloride can be treated so as to recover the individual salts, cuprous chloride and potassium chloride, and also recover any silver, which may be present in the double salt mixture.

To the present time, there have not been efficient and economic procedures by which these complex salts can be processed so as to recover the individual components, cuprous chloride and potassium chloride. For example, if it were desired to isolate solid potassium chloride from a solution of these salts, a large amount of water would have to be evaporated to concentrate the solution.

Complex salts of potassium chloride and copper chloride are also known in the art and have been reported in the literature by several authors. Species such as $KCuCl_2$, $K_2CuCl_3$ and $KCuCl_2.H_2O$ are reported by the following authors: J.J.P. Valeton and W. Fromel, Z. anorg. allgem. Chemie, 137, 91 (1924); O.A. Chaltykyan, Zhur. Obshchei Khim., 18, 1626 (1948); W.U. Malik, et al., Z. anorg. allgem. Chemie, 299, 322 (1959). However, none of these complexes are recovered and produced by crystallization from process streams of any type.

The prior art, as suggested in certain U.S. patents, recognizes that cuprous chloride may be crystallized from a solution as a double salt or complex with ammonia, as shown for example, in U.S. Pat. No. 1,814,822. Further, U.S. Pat. No. 3,278,232 disclosesthat cupric ion combines with ammonia in aqueous solution. Also, U.S. Pat. No. 3,279,897 teaches that ammoniation of water soluble compositions containing both sodium chloride and potassium chloride causes potassium chloride to be precipitated from solution when working with systems, such as $NaCl-KCl-NH_3-H_2O$. Further, U.S. Pat. No. 3,501,266 suggests that potassium halide salts may be precipitated from aqueous solutions of potassium halide salts by addition of ammonia to selectively precipitate the potassium halide salts.

It is also known from U.S. Pat. No. 3,502,431 to carry out the reaction of ammonium chloride with a reaction mass which may include metallic copper, potassium chloride and alumina. Further, Russian Pat. No. 430,566 deals with complexes of cuprous chloride and ammonium chloride in aqueous solutions.

In none of this prior art, however, is there any suggestion for the decomposition of complex salts of potassium chloride and cuprous chloride to recover the valuable components contained therein in an economically feasible manner. The present invention provides a method of this type.

DISCLOSURE OF THE INVENTION

It is, accordingly, one object of the present invention to provide a method for the recovery and/or production of cuprous chloride and potassium chloride from complex mixtures of these materials.

A further object of the present invention is to provide a method for the production and recovery of solid cuprous chloride and potassium chloride from double salts containing these components by reaction with ammonia, and also recover silver present in the double salt mixture.

Other objects and advantages of the present invention will become apparent as the description thereof proceeds.

In satisfaction of the foregoing objects and advantages, there is provided by this invention a method for the production and recovery of solid cuprous chloride and potassium chloride from the complex salt containing cuprous chloride and potassium chloride, by the steps which comprise:

(a) reacting an aqueous solution containing the complex salt of potassium chloride and cuprous chloride with ammonia;

(b) separating the resulting solid potassium chloride from a concentrated solution of cuprous chloride and ammonia, which, if silver was present in the original complex salt, would be obtained with the potassium chloride;

(c) removing the ammonia from the solution to cause precipitation of solid cuprous chloride; and (d) recovering the cuprous chloride.

Also provided is a continuous method wherein additional ammonia is added to the solution obtained after removal of the cuprous chloride in step (d), which is a dilute solution of cuprous chloride and potassium chloride in water, and to which additional complex salt is added, to regenerate the system $CuCl$-$KCl$-$NH_3$-$H_2O$ for precipitation of further potassium chloride and then repeating the basic steps for the recovery of potassium chloride and cuprous chloride.

BRIEF DESCRIPTION OF THE DRAWINGS

Reference is now made to the drawing accompanying the application wherein the FIGURE shows a schematic diagram showing the preferred embodiment of the invention.

BEST MODE FOR CARRYING OUT THE INVENTION

The hydrometallurgical refining of copper, as described in U.S. Pat. Nos. 3,785,944 and 3,879,272, involves the reaction of chalcopyrite in the presence of chloride which generally effects at least a 50% decomposition of the chalcopyrite and results in a solution containing cuprous chloride and potassium chloride. As described in Application Ser. No. (272,024) of Leonard R. Ochs, filed of even date, the addition of more potassium chloride results in formation of a relatively pure double salt of the cuprous chloride and potassium chloride, which may be generally described as being of the formula $K_2CuCl_3$, or $2KCl.CuCl$. Various attempts have been made to recover the valuable cuprous chloride and potassium chloride from this double salt. The present invention provides one method by which this may be achieved with good efficiency. Thus, the process of the present invention provides a method for decomposition of the double salt of potassium chloride and cuprous chloride with subsequent isolation of the potassium chloride and cuprous chloride for recovery and/or further processing as desired.

In the aqueous solution containing the cuprous chloride and potassium chloride double salt, the system present is $CuCl$-$KCl$-$H_2O$, which system comprises one of three different stable solid phases in equilibrium with the liquid. These solid phases are $CuCl$, $K_2CuCl_3$, and $KCl$, and each exists over different solution concentration ranges. Before the solid potassium chloride can be simply isolated from solution, a large amount of water would have to be evaporated to concentrate the solution. As a result, heretofore, the commercial process to decompose this double salt into solid cuprous chloride salt and potassium chloride from an aqueous solution by simple evaporation of the solution has not been economically feasible.

In accordance with the process of the present invention, ammonia is added in order to alter the phase equilibrium of the system to the extent that the solid double salt can be decomposed into its solid constituents in an economical manner. The premise on which this approach is based is that cuprous chloride is very soluble in ammonia solutions whereas potassium chloride is not. Thus, in an aqueous system containing ammonia, the double salt, $K_2CuCl_3$ or $2KCl.CuCl$, dissolves incongruently to produce solid potassium chloride and a solution reasonably concentrated in cuprous chloride. This concentrated solution results because it has been found that the solid double salt phase exists over a narrow concentration range which is unexpected. Thus, in accordance with the present invention, the process comprises dissolving the double salt of potassium chloride and cuprous chloride incongruently in an aqueous system containing ammonia so as to result in the system $CuCl$-$KCl$-$NH_3$-$H_2O$ to produce a solution saturated with cuprous chloride, potassium chloride, and a solid potassium chloride phase. Potassium chloride precipitates from solution and is removed as a solid, thus leaving the solution concentrated in CuCl and saturated with potassium chloride. Thereafter, the ammonia is removed from the system which decreases the solubility of the cuprous chloride and increases the solubility of KCl and causes the cuprous chloride to precipitate as a solid for recovery.

With the recovery of these valuable components, KCl and CuCl, the remaining system is a dilute solution of cuprous chloride and potassium chloride in water, or the system $KCl$-$CuCl$-$H_2O$. Ammonia is recycled to the dilute solution and additional double salt complex starting material is added to this dilute solution to again produce the system $CuCl$-$KCl$-$NH_3$-$H_2O$ which may be reprocessed to recover additional cuprous chloride and potassium chloride for recovery by repeating the steps of the process.

The reactions of the present invention may be carried out at any desired temperature ranging from about room temperature up to about 90° C., with the preferred temperatures being in the range of 40° to 60° C. The equilibrium vapor pressure of the system will be dependent on the ammonia concentration and may be either superatmospheric or subatmospheric. A total system pressure of atmospheric or superatmospheric is preferred from the practical operating standpoint.

Complex double salts of this type also often contain the valuable metal silver, usually present as a salt or compound. According to this invention, it is also possible to recover the silver component as a silver salt or compound in admixture with the recovered potassium chloride. It has been found that most of the silver contained in the double salt complex CuCl.2KCl, crystallizes out with the KCl during the decomposition of the double salt in an aqueous ammonia solution. Further, during the crystallization of CuCl from a solution of CuCl, KCl, and AgCl, the majority of the silver remains in solution and does not crystallize out with the CuCl. In the process of this invention, the solution of CuCl, KCl and AgCl is produced after the ammonia is removed from the solution from which the KCl is crystallized.

The process of this invention is described in the drawing accompanying the application in flow sheet form. As may be seen, the complex salt $K_2CuCl_3$ from line 1, along with $NH_3$ from line 2, and recycle solution from line 3, are fed into the KCl crystallization chamber 4. In this chamber, decomposition of the double salt $K_2CuCl_3$ takes place in the presence of the ammonia in the crystallizer at a temperature of about 25° to 90° C., preferably at 40° to 60° C. At the higher temperatures, it is necessary to operate the crystallizer under pressure. The resulting slurry is then removed and enters the separator 5 from line 6. Solid KCl is removed from the separator 5 by line 7. In the preferred aspect, the KCl is dried in drier 8, and recovered at line 9, If the starting salt complex contains a silver component, the silver, as a salt or compound, will be contained in admixture with the KCl from which it can be separated by conventional procedures. The ammonia and water removed during the drying step are removed by line 10 and recycled to crystallization chamber 4. The solution recovered from separator 5 is then passed to the ammonia recovery column 11 by line 12.

In the recovery column, ammonia, along with some water, is distilled from the solution and recycled to the KCl crystallizer 4 via line 13 and via line 2. The aqueous solution, which now contains CuCl and KCl, is fed by line 14 into the vacuum crystallizer 15 where CuCl is crystallized at about 25° to 60° C., preferably at 40° to 50° C. The slurry from the crystallizer 15 is removed by line 16 and enters the separator 17 where solid CuCl is separated from the mother liquor and is removed by line 18 for further processing. The resulting mother liquor, now containing less than about 5 weight percent of CuCl, is withdrawn from the separator 17 via line 19 and is recycled to the KCl crystallizer 4 via line 3.

The solid CuCl in separator 17 is washed with wash water introduced by line 20. In the aspect shown in the drawing, the wash water filtrate is removed by line 21 to evaporator 22 where at least a portion is removed by line 23 and pumped by pump 24 to wash water 20. Make up wash water may be added from line 25 as necessary. The remainder is recycled from reuse by line 26 in the crystallizer after mixing with the mother liquor being recycled at line 19.

It is understood that the solids removed from the system may be washed with water to remove any adhering mother liquor, and that such wash streams may be returned in all or in part to the system to maintain the proper water balance.

The ammonia concentration required to decompose the double salt is preferably in the range of about 10 to 25% and more preferably about 15 to 20% by weight based on the total system. However, it will be understood that any concentration of ammonia may be used if desired in the process so long as operable.

The following specific embodiment and examples are presented to illustrate the invention, but it is not to be considered as limited thereto. In these examples, and throughout the specification, parts are by weight unless otherwise indicated.

SPECIFIC EMBODIMENT

Using the apparatus exemplified in the drawing, a quantity of the complex salt $K_2CuCl_3$ and a mixture of 90 Wt.% $NH_3$ and 10 Wt.% water from an ammonia recovery column, are fed into the KCl crystallization chamber. In this chamber, decomposition of the double salt, $K_2CuCl_3$, takes place in the presence of the ammonia in the crystallizer at a temperature of 50° C. The resulting slurry is then removed and enters a separator where solid KCl is removed and dried at 100° C. in a drier. Gases removed during the drying step, which comprise $NH_3$ and $H_2O$, are recycled to the KCl crystallizer. The solid dried KCl is recovered.

The liquid phase from the separator which comprises CuCl, a small amount of KCl, water and ammonia, is passed to an $NH_3$ distillation column and a mixture of 90 Wt.% $NH_3$ and 10 Wt.% water is removed and passed to the KCl crystallizer to provide the $NH_3$ necessary for reaction with the complex salt.

The residue from the recovery column is passed to a vacuum crystallizer, where at 25° C. CuCl is precipitated and the resulting mixture is passed to a separator and washed with water. The solid CuCl is removed and dried for recovery. The filtrate and part of the wash water are recycled to the KCl crystallizer. The remainder of the wash water is removed from the system by an evaporator.

EXAMPLE I

In this example, the reactants were placed in closed plastic bottles along with a small amount of copper metal to reduce any cupric ions present. Two separate runs were carried out. In one example, an aqueous solution of the double salt was processed at 25° C. in the presence of ammonia. In the second example, the aqueous solution of the double salt was processed at 50° C. at equilibrium pressure containing ammonia. Each of the bottles containing the reactants was tumbled in a water bath and heated at 5° to 10° above the desired equilibration temperature for one to two hours. At this point the temperature was dropped to the equilibrium temperature and the bottles were tumbled in the bath for seven days. At the end of the period, the solids were allowed to settle and the clear liquids were sampled with a pipette and analyzed. The wet residue or filter cakes was obtained for analysis by vacuum filtration using a heated Buchner funnel.

The table below contains the input weights and the composite of the resulting liquids and solids.

|  | Run 1 | Run 2 |
| --- | --- | --- |
| Temp (°C.) | 25 | 50 |
| Input |  |  |
| Wt. of Solution (g) | 100 | 100 |
| Composition of Solution (Wt. %) |  |  |
| $NH_3$ | 18 | 18 |
| CuCl | 5 | 5 |
| KCl | 13 | 13 |
| HOH | 64 | 64 |
| Wt. of $K_2CuCl_3$ | 35 | 35 |

-continued

|  | Run 1 | Run 2 |
|---|---|---|
| Output |  |  |
| Composition of: |  |  |
| Liq. Phase (Wt. %) |  |  |
| $NH_3$ | 14.0 | 12.8 |
| CuCl | 15.5 | 15.3 |
| KCl | 11.4 | 14.9 |
| HOH | 59.1 | 57.0 |
| Solid Phase | KCl | KCl |

EXAMPLE II

In this example, $NH_3$ was distilled from a solution containing CuCl, KCl and $NH_3$ to yield a solution from which CuCl is precipitated. The solutions, before and after distillation, contained the following compositions:

|  | Composition of Solution (Wt. %) | |
|---|---|---|
| Component | Before Distillation | After Distillation |
| CuCl | 10.0 | 11.1 |
| KCl | 12.0 | 17.6 |
| $NH_3$ | 20.7 | 1.1 |
| HOH | 57.3 | 70.2 |

As may be seen from these analyses, removal of the ammonia resulted in a solution increased in CuCl and KCl concentration from which the CuCl could be precipitated and recovered. The difference in the KCl/CuCl weight ratio between the initial solution and final solution was due to precipitation of the CuCl after distillation.

EXAMPLE III

An aqueous solution maintained at about 90° C. contained 11.5 Wt.% CuCl and 15 Wt.% KCl. Upon cooling to 25° C., a solid phase which was CuCl, and a liquid phase resulted. The solid phase was removed and the composition of the liquid phase was determined to contain about 6 Wt.% CuCl, 16 Wt.% KCl and 78 Wt.% water which was suitable for recycle.

EXAMPLE IV

In this example, $K_2CuCl_3$ containing AgCl, is decomposed with $NH_3$ to produce a saturated solution and a solid composed of KCl and a silver compound. The components, experiment conditions, and results are shown in the following table:

| Run No. | 1 | 2 |
|---|---|---|
| Temp. (C.°) | 25 | 50 |
| Input |  |  |
| Wt of Solution (g) | 100 | 100 |
| Composition of Solution (Wt. %) |  |  |
| $NH_3$ | 24.0 | 24.0 |
| CuCl | 4.4 | 4.4 |
| KCl | 8.5 | 8.5 |
| HOH | 62.0 | 62.0 |
| Ag | 1.1 | 1.1 |
| Wt. of $K_2CuCl_3$ | 63.1 | 63.1 |
| Output |  |  |
| Composition of Liquid Phase (Wt. %) |  |  |
| $NH_3$ | 19.0 | 18.8 |
| CuCl | 23.5 | 24.3 |
| KCl | 8.3 | 12.2 |
| Ag | 0.0005 ± 15% | 0.0011 ± 15% |
| HOH | 49.2 | 44.7 |
| Solid Phase | Mostly KCl with Ag compound | Mostly KCl with Ag compound |

EXAMPLE V

In this example, CuCl is crystallized in the presence of AgCl from a solution containing CuCl-KCl-AgCl-$H_2O$. In the experiment, the solids, CuCl, KCl and AgCl, were dissolved in water at 75° C. and equilibrated to crystallize the CuCl from solution. The resulting slurry was filtered at room temperature and the filtrate and wet residue were analyzed. The results are shown below.

|  | CuCl | KCl | Ag | $H_2O$ |
|---|---|---|---|---|
| Input |  |  |  |  |
| Wt % | 12.0 | 16.5 | 0.00066 | remainder |
| Gms | 12.0 | 16.5 | 0.00066 | remainder |
| Output Solution |  |  |  |  |
| Wt % | 8.13 | 17.91 | 0.00056 ± 15% | remainder |
| Gms | 7.6 | 16.8 | 0.00053 ± 15% | remainder |
| Solid (Wet Residue) |  |  |  |  |
| Wt % | 81.4 | 5.81 | 0.0025 ± 15% | remainder |
| Gms | 4.9 | 0.35 | 0.0015 ± 15% | remainder |

Upon crystallization of CuCl, about 80% of the Ag remained in solution.

EXAMPLE VI

Batch tests were conducted to verify the multi-step process for decomposing double salt into CuCl and KCl. A pregnant liquor, containing the CuCl and KCl components, was obtained from the commercial process unit practicing the process of U.S. Pat. No. 3,785,944, and the double salt was prepared by reducing cupric copper to cuprous with copper metal, and then adding KCl to the solution at 65° C. The temperature was dropped to 25° C. to crystallize the double salt.

For the KCl crystallization step, an aqueous solution of CuCl and KCl was prepared, and the double salt was added. The temperature was increased to dissolve as much as the double salt as possible. To insure that all the copper was in the cuprous state, metal copper strips and a few drops of HCl were added to the mixture. The mixture was stirred at the elevated temperature until it became clear. Then the temperature was reduced to the desired level and ammonia gas was purged through the mixture during the 3-4 hours equilibration period. The slurry as pressure filtered at the equilibration temperature using $N_2$ as a blanket. The KCl crystals were dried with a stream of $N_2$, and ammonia was removed from the filtrate by distillation under a blanket of $N_2$. Also, a copper metal strip was placed in the mixture during distillation to prevent oxidation of the cuprous to cupric. Finally, the solution was cooled to the desired temperature, and the CuCl was recovered by filtering and drying under a $N_2$ atmosphere.

The following table contains the results for the series of batchwise experiments. In the first step of the test, the double salt was prepared as above, but for two of the series of tests, additional silver, as $AgNO_3$, was added to the pregnant liquor to increase the amount of silver in the double salt. In the second step of the test, the double salt was incongruently dissolved in the $CuCl-KCl-NH_3-H_2O$ solution to produce KCl, which contains the silver and the saturated solution of CuCl and KCl in the ammonical solution. In the third step, the $NH_3$ was removed and the resulting slurry filtered to produce the CuCl solid and a solution.

TABLE I
Results of the Series of Batchwise Experiments

| Step 1 — Preparation of Double Salt from Pregnant Liquor | | | | |
|---|---|---|---|---|
| Test No. | 1 | 2 | 3 | 4 |
| Input (Gms) | | | | |
| Pregnant Liquor[1] | 800 | 800 | 800 | 800 |
| KCl | 104 | 104 | 104 | 104 |
| Cu° | 5 | 5 | 5 | 5 |
| Additional Ag (ppm) | 0 | 102 | 0 | 100 |
| Output | | | | |
| Filtrate (Wt.) | 683.1 | 696.9 | — | 699.0 |
| Analysis (Wt. %) | | | | |
| Na | 4.54 | 4.58 | — | 4.45 |
| K | 6.96 | 6.86 | — | 6.39 |
| Cu | 2.65 | 2.33 | — | 2.09 |
| Fe | 1.30 | 1.18 | — | 1.10 |
| Ag | .00108 | .01106 | — | .0118 |
| Residue (Wt.) | 120.8 | 128.6 | 120.5 | 142.1 |
| Analysis (Wt. %) | | | | |
| Na | 0.012 | 0.0079 | 0.024 | 0.0039 |
| K | 34.41 | 36.48 | 33.56 | 33.83 |
| Cu | 26.26 | 26.53 | 25.50 | 24.80 |
| Fe | 0.0088 | 0.0088 | 0.0044 | 0.0044 |
| Ag | 0.00091 | 0.00912 | 0.00067 | 0.01082 |

[1]Analysis of Pregnant Liquor (Wt. %)
Na — 3.42
K — 4.51
Cu — 5.65
Fe — 1.04
Ag — 0.0018

| Step 2 — Dissolving $K_2CuCl_3$ Incongruently to Produce KCl and Saturated Solution | | | | |
|---|---|---|---|---|
| Test No. | 1 | 2 | 3 | 4 |
| Temperature °C. | 50 | 50 | 25 | 25 |
| Input (Grams) | | | | |
| CuCl | 9 | 9 | 9 | 9 |
| KCl | 17 | 17 | 17 | 17 |
| $H_2O$ | 98 | 98 | 98 | 98 |
| Cu° | 2 | 2 | 2 | 2 |
| $K_2CuCl_3$[1] | 100 | 100 | 100 | 100 |
| $NH_3$ | Bubbled Through Solution | | | |

TABLE I-continued
Results of the Series of Batchwise Experiments

| Output Solution (Wt.) | 180.5 | 161.7 | 185.3 | 188.5 |
|---|---|---|---|---|
| Analysis (Wt. %) | | | | |
| Na | 0.0040 | 0.0043 | 0.0010 | 0.0023 |
| K | 6.88 | 5.97 | 4.31 | 4.16 |
| Cu | 16.40 | 15.91 | 15.49 | 15.49 |
| Fe | — | 0.00166 | 0.00169 | 0.00076 |
| Ag | 0 | 0 | 0 | 0.00025 |
| $NH_3$ | 11.90 | 12.60 | 19.98 | 21.07 |
| Residue (Wt.) | 54.7 | 46.0 | 66.4 | 66.6 |
| Analysis | | | | |
| Na | 0.00151 | 0.00185 | 0.00959 | 0.00067 |
| K | 53.83 | 51.21 | 54.72 | 52.12 |
| Cu | 2.67 | 5.86 | 3.73 | 3.50 |
| Fe | — | 0.0043 | 0.00497 | 0.00310 |
| Ag | 0.00252 | 0.01197 | 0.00178 | 0.01242 |
| $NH_3$ | 0.20 | 1.23 | 0.75 | 1.09 |

[1]$K_2CuCl_3$ is the residue from Step 1 for each test

| Step 3 — Removing the $NH_3$ and Crystallizing the CuCl | | | |
|---|---|---|---|
| Test No. | 1 | 2 | 3 |
| Crystallization Temp. °C. | 50 | 50 | 25 |
| Input | | | |
| Solution[1] | 174.5 | 155.3 | 175.6 |
| Output | | | |
| Solution (Wt.) | 153.2 | 126.6 | 131.3 |
| Analysis (Wt. %) | | | |
| Na | 0.00528 | 0.0043 | 0.01092 |
| K | 9.89 | 8.56 | 5.46 |
| Cu | 3.79 | 5.64 | 6.53 |
| Fe | — | 0.0016 | 0.00107 |
| Ag | 0 | 0 | 0 |
| $NH_3$ | 0.99 | 1.63 | 3.81 |
| Residue (Wt.) | 28.6 | 24.3 | 29.0 |
| Analysis (Wt. %) | | | |
| Na | 0.00488 | 0.0080 | 0.00418 |
| K | 2.60 | 1.37 | 0.73 |
| Cu | 56.92 | 62.35 | 59.51 |
| Fe | — | 0.0069 | 0.00418 |
| Ag | 0 | 0 | 0 |
| $NH_3$ | 11.38 | 12.17 | 12.11 |

[1]Input Solution is the Output Solution from Step 2 for each test.

The following Table II describes the weight ratio of the component ions to copper for the pregnant liquor, the double salt, and the final CuCl solid. The following Table III is a complete analysis of the CuCl solid for the three tests.

TABLE II
Results of Series of Batchwise Experiments
(Weight Ratio of the Components for the Pregnant Liquor, The Double Salt, and the Final CuCl Solid)

| Test No. | K | Ag × 10⁴ | Sb × 10⁴ | Bi × 10⁴ | As × 10⁴ | Pb × 10⁴ | Fe × 10⁴ |
|---|---|---|---|---|---|---|---|
| Test No. 1 | | | | | | | |
| Preg. Liq. | 1.90 | 2.07 | 1.43 | 6.10 | 0.63 | 157 | 1750 |
| Double Salt | 1.06 | 0.28 | <0.01 | 0.04 | 0.43 | 86 | 0.0 |
| CuCl | 0.45 | 0.0 | <0.0052 | 0.018 | 0.31 | 19.3 | 18.0 |
| Test No. 2 | | | | | | | |
| Preg. Liq. | 1.90 | 22.3 | 1.43 | 6.10 | 0.63 | 157 | 1750 |
| Double Salt | 0.95 | 1.9 | 0.004 | 0.03 | 0.11 | 105 | 1.1 |
| CuCl | 0.22 | 0.032 | <0.0016 | 0.011 | 0.10 | 14.0 | 0.50 |
| Test No. 3 | | | | | | | |
| Preg. Liq. | 1.90 | 2.07 | 1.43 | 6.10 | 0.63 | 157 | 1750 |
| Double Salt | 1.2 | 0.388 | 0.032 | 0.012 | 0.388 | 192 | 0.8 |
| CuCl | 0.013 | 0.145 | 0.009 | 0.067 | 0.164 | 49.1 | 0.55 |

| Test No. | Se × 10⁴ | Te × 10⁴ | Mn × 10⁴ | Zn × 10⁴ | Ni × 10⁴ | Sn × 10⁴ |
|---|---|---|---|---|---|---|
| Test No. 1 | | | | | | |
| Preg. Liq. | 0.094 | 0.105 | 75 | 0.193 | 11.9 | — |
| Double Salt | 0.039 | <0.004 | 0.0 | 0.39 | 0.13 | — |
| CuCl | 0.090 | <0.0035 | 0.035 | 0.95 | 0.052 | 0.86 |
| Test No. 2 | | | | | | |
| Preg. Liq. | 0.094 | 0.105 | 75 | 0.193 | 11.9 | — |

TABLE II-continued

Results of Series of Batchwise Experiments
(Weight Ratio of the Components for the
Pregnant Liquor, The Double Salt, and the Final CuCl Solid)

| | | | | | | |
|---|---|---|---|---|---|---|
| Double Salt | 0.04 | 0.002 | 0.02 | 0.43 | 0.04 | — |
| CuCl | 0.013 | 0.000092 | 0.032 | 0.48 | 0.048 | 0.096 |
| Test No. 3 | | | | | | |
| Preg. Liq. | 0.094 | 0.105 | 75 | 0.193 | 11.9 | — |
| Double Salt | 0.044 | 0.040 | 0.24 | 0.64 | 0.24 | — |
| CuCl | 0.027 | 0.044 | 0.018 | 0.20 | 0.145 | — |

TABLE III

Complete Analysis of the CuCl for the Three Tests

| Component | Test 1 | Test 2 | Test 3 |
|---|---|---|---|
| Cu, Wt. % | 56.92 | 62.35 | 59.51 |
| K, Wt. % | 2.60 | 1.37 | 0.73 |
| Ag, ppm | 0.0 | 2 | 8 |
| Fe, ppm | 100 | 31 | 30 |
| Pb, ppm | 1,110 | 872 | 2,700 |
| Mn, ppm | 2 | 2 | 1 |
| Zn, ppm | 54 | 30 | 11 |
| Na, ppm | 3 | 3 | 8 |
| Sb, ppm | <0.3 | <0.1 | 0.5 |
| Bi, ppm | 1 | 0.68 | 3.7 |
| As, ppm | 17.5 | 6.3 | 9 |
| Se, ppm | 5.1 | 0.8 | 1.5 |
| Te, ppm | <0.2 | <0.06 | ≦2.4 |
| Sn, ppm | 16 | 2 | — |
| Na, ppm | 48.8 | 80 | 41.8 |

As will be noted from the results of Tables I, II, and III of the batch experiments of this Example, during the crystallization of $K_2CuCl_3$ from the pregnant liquor, of the following impurities; Ag, Sb, Bi, As, Pb, Fe, Se, Te, Mn, Zn, and Ni, only Pb was concentrated in the double salt ($K_2CuCl_3$). The absolute amount of Ag that crystallized with the $K_2CuCl_3$ increased as the concentration of Ag in the pregnant liquor increased. In addition, the double salt dissolves incongruently in the $CuCl-KCl-NH_3-H_2O$ solution to produce essentially KCl and a large portion of the Ag, Fe, Pb, Mn, Ni, Sb, Bi, As, and Te crystallizes and remains with the KCl. Further, the resulting CuCl that is produced from the solution after the $NH_3$ is removed has a lower level of impurities than the double salt, that is, the impurity ion to copper ratio for the CuCl is lower than the ratio for the double salt for most of the impurities. Thus, the overall process of crystallizing double salt from the pregnant liquor, decomposing the double salt in an ammoniacal solution with subsequent recovery of the CuCl, results in a copper product purer than that in the pregnant liquor.

The invention has been described herein with reference to certain preferred embodiments. However, as obvious variations thereon will become apparent to those skilled in the art, the invention is not to be limited thereto.

Having thus set forth and disclosed the nature of the invention, what is claimed is:

1. A method for the recovery of cuprous chloride and potassium chloride from a complex salt containing these components in aqueous solution which comprises the steps of:

(a) reacting an aqueous solution of the complex salt of potassium chloride and cuprous chloride with ammonia;

(b) separating the resulting solid potassium chloride from a solution containing the cuprous chloride and ammonia;

(c) removing the ammonia from the solution to cause precipitation of solid cuprous chloride, and (d) recovering the cuprous chloride.

2. A method according to claim 1 wherein the complex salt of cuprous chloride and potassium chloride is the double salt $2KCl.CuCl$ obtained from the decomposition of chalcopyrite by cupric chloride in the presence of potassium chloride.

3. A method according to claim 1 wherein the reaction is conducted in the temperature range of from about room temperature to about 90° C.

4. A method according to claim 1 wherein the aqueous solution of ammonia contains about 10 to 25% by weight of $NH_3$.

5. A method according to claim 1 wherein the ammonia is removed from the system by distillation.

6. A method according to claim 1 wherein removal of the solid potassium chloride from the system results in an ammonia solution concentrated in cuprous chloride.

7. A method according to claim 1 wherein, after removal of the cuprous chloride, additional ammonia and additional complex salt are added to the resulting mother liquid solution which contains cuprous chloride and potassium chloride, to again precipitate potassium chloride, removing the potassium chloride from the system, further evaporating ammonia from the system to precipitate additional cuprous chloride, removing the cuprous chloride, and recycling the resulting mother liquors to step a).

8. A method according to claim 1 wherein the reaction is conducted at a temperature of about 25° C. to 60° C.

9. A method according to claim 1 wherein the reaction is conducted at a temperature of about 50° C.

10. A method according to claim 1 wherein the complex salt is $2KCl.CuCl$.

11. A method according to claim 1 wherein the precipitated cuprous chloride isseparated from a mother liquid solution of cuprous chloride and potassium chloride, and said dilute solution is then recycled for further reaction with ammonia with the addition of at least a further portion of complex salt.

12. A method according to claim 1 wherein the complex salt contains silver.

13. A method according to claim 12 wherein the silver is recovered as a compound of silver in admixture with the solid potassium chloride.

* * * * *